US 8,600,143 B1

(12) United States Patent
Kulkarni et al.

(10) Patent No.: US 8,600,143 B1
(45) Date of Patent: Dec. 3, 2013

(54) METHOD AND SYSTEM FOR HIERARCHICAL TISSUE ANALYSIS AND CLASSIFICATION

(75) Inventors: Ashok V. Kulkarni, San Jose, CA (US); Scott Young, Soquel, CA (US); Eliezer Rosengaus, Palo Alto, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 327 days.

(21) Appl. No.: 13/112,977

(22) Filed: May 20, 2011

Related U.S. Application Data

(60) Provisional application No. 61/346,748, filed on May 20, 2010.

(51) Int. Cl.
*G06K 9/00* (2006.01)

(52) U.S. Cl.
USPC ........................................................ 382/133

(58) Field of Classification Search
USPC ......... 382/128, 129, 133, 159–161, 224, 225, 382/227; 435/1.1; 73/61.72; 700/47
See application file for complete search history.

(56) References Cited

U.S. PATENT DOCUMENTS

| | | | | |
|---|---|---|---|---|
| 4,183,013 A * | 1/1980 | Agrawala et al. | ............. | 382/173 |
| 6,839,462 B1 * | 1/2005 | Kitney et al. | ................. | 382/173 |
| 6,970,587 B1 * | 11/2005 | Rogers | ........................ | 382/132 |
| 8,319,793 B2 * | 11/2012 | Schaepe et al. | ............... | 345/619 |
| 2001/0031920 A1 * | 10/2001 | Kaufman et al. | ............. | 600/431 |
| 2010/0111396 A1 * | 5/2010 | Boucheron | ................... | 382/133 |
| 2010/0260406 A1 * | 10/2010 | Sammak et al. | ............. | 382/133 |
| 2010/0265267 A1 * | 10/2010 | Schaepe et al. | ............... | 345/619 |

* cited by examiner

*Primary Examiner* — Shervin Nakhjavan
(74) *Attorney, Agent, or Firm* — Suiter Swantz pc llo

(57) ABSTRACT

The present invention may include segmenting an image at a first resolution level and a second resolution level, wherein one or more parameters of a segmentation algorithm are trainable via user classification feedback, extracting features from a first plurality of segment primitives and a second plurality of segment primitives, wherein one or more parameters of a segment feature extraction algorithm are trainable via user classification feedback, building a first and second segmentation hierarchy by generating one or more clusters of the first plurality of segment primitives and the second plurality of segment primitives, extracting one or more features from the first segmentation hierarchy and the second segmentation hierarchy utilizing a hierarchy feature extraction algorithm, determining an inter-level relationship between the clusters generated for the first resolution level and the second level, and automatically classifying one or more tissue elements of the tissue specimen via a user-trained classification algorithm.

25 Claims, 11 Drawing Sheets

METHOD AND SYSTEM FOR HIERARCHICAL TISSUE ANALYSIS AND CLASSIFICATION

CROSS-REFERENCE TO RELATED APPLICATION

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a regular (non-provisional) patent application of United States Provisional Patent Application entitled DIGITAL PATHOLOGY METHODS AND APPARATUS, naming Scott Young, Eliezer Rosengaus, and Ashok Kulkarni as inventors, filed May 20, 2010, Application Ser. No. 61/346,748.

TECHNICAL FIELD

The present invention generally relates to a method and system for digital pathology and, more particularly, to a method and system for tissue analysis and classification utilizing a hierarchical segmentation scheme in concert with pathologist provided classification feedback.

BACKGROUND

Pathology is the study and diagnosis of disease through examination of cells, clusters of cells, tissues, organs, and body fluids. In a typical setting a pathologist may diagnose and characterize a given disease by examining a sample (e.g., tissue sample) removed from a patient. Tissue samples are often prepared by slicing a given tissue sample into thin slices. These thin slices are then mounted onto glass slides, which may be treated with a reagent or stain in order to improve visible contrast.

In a typical setting, the pathologist then analyzes the tissue sample using a microscope system. In this setting, the pathologist may manually scan the tissue sample at various locations and various magnifications in order to identify abnormal cells or cell clusters. Manual pathology methods are tedious and in many cases a pathologist may need to examine hundreds of imagery fields before identifying tissue elements (e.g., cells or cell clusters) of interest. Due to this large volume of imagery fields, a pathologist is susceptible to eye strain and general fatigue. As fatigue and eye strain increase, the likelihood for errors increases. It is therefore advantageous to develop automated systems for guiding pathologist analysis and classification.

SUMMARY

A method for hierarchical segmentation and classification of image data from a tissue specimen is disclosed. In one aspect, a method may include, but is not limited to, receiving one or more images of a tissue specimen; segmenting the one or more images at a first resolution level and at least a second resolution level utilizing a segmentation algorithm, wherein one or more parameters of the segmentation algorithm are trainable via user classification feedback, wherein the image at the first resolution level is segmented into a first plurality of segment primitives and the image at the at least a second resolution level is segmented into a second plurality of segment primitives; extracting one or more features from some of the first plurality of segment primitives and some of the at least a second plurality of segment primitives utilizing a segment feature extraction algorithm, wherein one or more parameters of the segment feature extraction algorithm are trainable via user classification feedback; building a first segmentation hierarchy by generating one or more clusters of some of the first plurality of segment primitives utilizing a clustering algorithm, wherein one or more of the clustering algorithm parameters are trainable via user classification feedback; building at least a second segmentation hierarchy by generating one or more clusters of some of the at least a second plurality of segment primitives utilizing the clustering algorithm, wherein and one or more clusters of some of the second plurality of segment primitives; extracting one or more features from the first segmentation hierarchy and the at least a second segmentation hierarchy utilizing a hierarchy feature extraction algorithm, wherein one or more hierarchy feature extraction algorithm parameters are trainable via feedback from user classification feedback; determining an inter-level relationship between one or more clusters generated for the first resolution level and one or more clusters generated for the at least a second level by comparing one or more characteristics of the one or more clusters of the first resolution level to one or more characteristics of the one or more clusters of the at least a second resolution level; and automatically classifying one or more tissue elements of the tissue specimen via a user-trained classification algorithm utilizing at least one of the extracted features from some of the first plurality of segment primitives, the extracted features from some of the at least a second plurality of segment primitives, the extracted features from the first segmentation hierarchy, the extracted features from the at least a second segmentation hierarchy, the determined inter-level relationship between clusters of the first resolution level and the clusters of the at least a second resolution level, or user classification feedback.

An apparatus hierarchical segmentation and classification of image data from a tissue specimen is disclosed. In one aspect, this may include, but is not limited to, one or more image sources; one or more user interfaces; one or more display devices; and one or more computer systems configured to: receive one or more images of a tissue specimen; segment the one or more images at a first resolution level and at least a second resolution level utilizing a segmentation algorithm, wherein one or more parameters of the segmentation algorithm are trainable via user classification feedback, wherein the image at the first resolution level is segmented into a first plurality of segment primitives and the image at the at least a second resolution level is segmented into a second plurality of segment primitives; extract one or more features from some of the first plurality of segment primitives and some of the at least a second plurality of segment primitives utilizing a segment feature extraction algorithm, wherein one or more parameters of the segment feature extraction algorithm are trainable via user classification feedback; build a first segmentation hierarchy by generating one or more clusters of some of the first plurality of segment primitives utilizing a clustering algorithm, wherein one or more of the clustering algorithm parameters are trainable via user classification feedback; build at least a second segmentation hierarchy by generating one or more clusters of some of the at least a second plurality of segment primitives utilizing the clustering algorithm, wherein and one or more clusters of some of the second plurality of segment primitives; extract one or more features from the first segmentation hierarchy and the at least a second segmentation hierarchy utilizing a hierarchy feature extraction algorithm, wherein one or more hierarchy feature extraction algorithm parameters are trainable via feedback from user classification feedback; determine an inter-level relationship between one or more clusters generated for the first resolution level and one or more clusters generated for the at least a second level by comparing one or more characteristics of the one or more clusters of the first resolution level to one or more characteristics of the one or more clusters of the at least a second resolution level; and automatically classify one or more tissue elements of the tissue specimen utilizing at least one of the extracted features from some of the first plurality of segment primitives, the extracted features from some of the at least a second plurality of segment primitives, the extracted features from the first segmentation hierarchy, the extracted features from the at least a second segmentation hierarchy, the determined inter-level relationship between clusters of the first resolution level and the clusters of the at least a second resolution level, or user classification feedback.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Figure 1A:
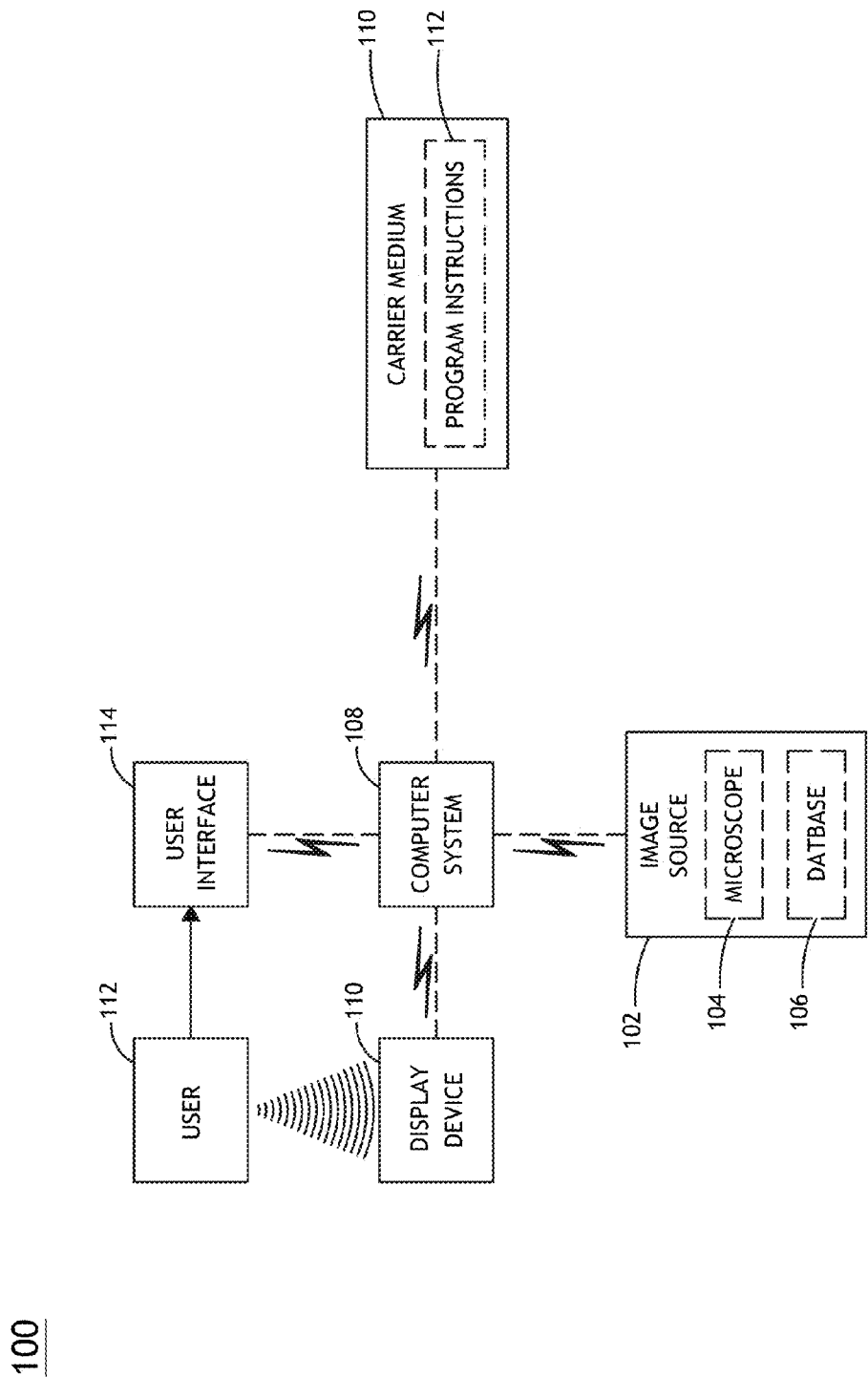
FIG. 1A is a block diagram illustrating a system for hierarchical segmentation and classification of image data from a tissue specimen, in accordance with one embodiment of the present invention.
Figure 1B:
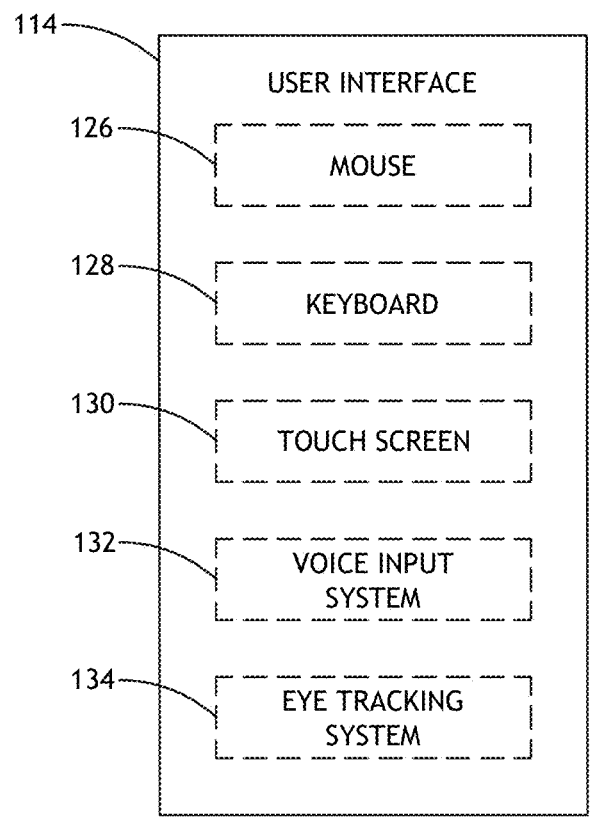
FIG. 1B is a block diagram illustrating a variety of user interface systems, in accordance with one embodiment of the present invention.
Figure 1C:
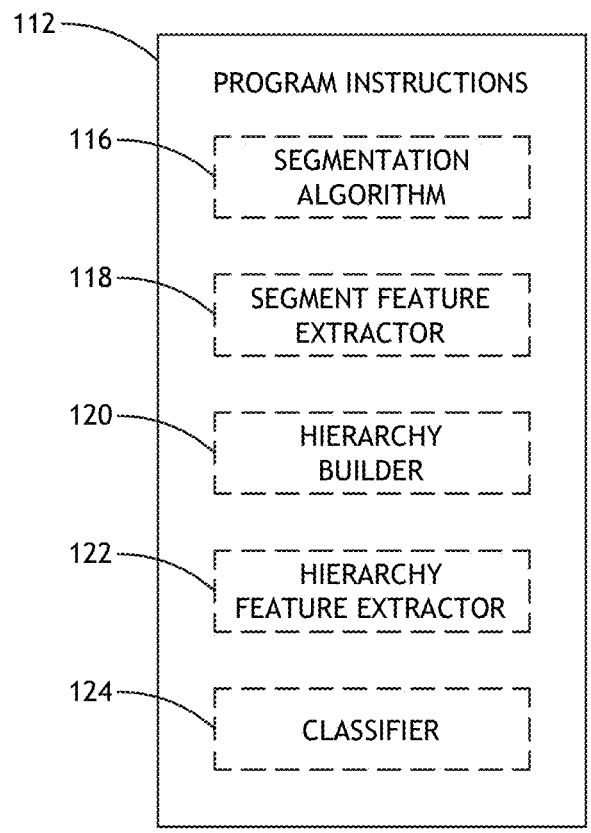
FIG. 1C is a block diagram illustrating a variety of analysis algorithms, in accordance with one embodiment of the present invention.

Reference will now be made in detail to the subject matter disclosed, which is illustrated in the accompanying drawings.

Referring generally to FIGS. 1A through 4, a method and system for hierarchical tissue analysis and classification is described in accordance with the present disclosure. Scene segmentation and user-trained classification may be utilized at various scales of an image resolution hierarchy. Employing scene segmentation and user-trained classification at each resolution level of a segment-cluster hierarchy allows for the rapid analysis of a given image at a low resolution level in order to identify regions of interest to the user. Upon identification of a region of interest the method and system of the present disclosure, the regions of interest may then be displayed to the user at a higher resolution level.

FIGS. 1A through 4 illustrate a system and method for hierarchical tissue analysis and classification. In one aspect, one or more computer systems 108 of the system 100 may be configured to receive one or more images of a tissue specimen from an image source 102 of the system 100. For example, the image source 102 may include an automated microscope system 104 configured to image tissues specimens prepared for general pathology studies. For instance, the microscope system 104 may operate in various imaging modes, including, but not limited to, visible broadband mode, fluorescence mode, immunofluorescence mode, transmission mode, bright field illumination mode, or dark field illumination mode. It should be recognized that any optical microscopy technique known in the art is suitable for implementation in the context of the present invention. Moreover, it is further recognized that the microscope 104 may include a CCD camera or TDI (Time Delay Integration) camera suitable for capturing digital images of the analyzed tissue specimens. In this manner, the output of the CCD camera or TDI camera may be communicatively coupled to a computer system 108 (e.g., CPU of a computer) of the system 100, allowing for the transfer of imagery data from the automated microscope system 104 to the computer system 108. In a further instance, the automated microscope system 104 may be configured to accept instructions from another subsystem of the system 100 in order to carry out a chosen microscopy sampling plan. For instance, the microscope 104 may accept instructions from one or more computer systems 108 of the system 100. Upon receiving the instructions from the computer system 108, the microscope system 104 may perform the selected set of imaging measurements.

By way of another example, imagery data from one or more microscopes may be stored in a database (e.g., computer memory). It is recognized that any imagery data storage method known in the art is suitable for implementation in the present invention. For example, imagery data from one or more microscope systems may be transferred to and stored in a database 106 on a hard drive of a communicatively coupled desktop computer. In another example, the imagery data may be stored on a database 106 maintained on an accessible network server. Upon receiving instructions from one or more computer system 108 of the system 100, the imagery data stored in the database 106 may then be transferred to the computer system 108 (e.g., processor) of the system 100 for analysis, which will be discussed further herein.

In another aspect, the system 100 may include a display device 110 and a user interface 114. In one embodiment, the system 100 may include a digital monitor communicatively coupled to the computer system 108 of the system 100. In this manner, "image patches" may be displayed to the user by the system 100 for review and classification. For example, the extractor (e.g., 118 and 122) and classifier (e.g., 124) algorithms of the system 100, which are discussed in detail further herein, may auto-select regions (based on the training of the algorithms via user classification feedback) of interest and display those regions to a user for classification. In a further embodiment, the display device 110 may be utilized by the system 100 to display multiple specimens simultaneously in an image gallery. In addition, the same image location may be displayed in various imaging modes (e.g. bright field, dark field or fluorescence), where these image patches in different modes may be displayed side by side for user viewing, or the user may be able to toggle a given image patch by viewing the aligned (overlaid) images in different modes, similar to user techniques with a manual microscope, involving manually switching imaging modes while keeping the slide position constant. In addition to displaying an image scan file, the display device 110 may display a companion file associated with one or more image scan files. For instance, a companion file associated with an image scan file may contain various pieces of information associated with the given specimen and image scan, including, but not limited to, size, count, density, text, and measurement information.

In one embodiment, the user may append or alter the companion file utilizing the user interface 114 of the system 100. For instance, a pathologist may insert notes or data related to the image scan file into the companion file utilizing the user interface 110. This information may then be accessed at a later time by a user or by another component (e.g., segment feature extractor 118 or classifier 124) of the system 100. In an additional embodiment, the companion file may simply accompany the image scan file and need not be displayed to the user. In this manner, the companion file may log information provided by the user by means other than traditional text and graphical user interface (GUI) input.

In a general sense, the user interface 114 may include any user interface known in the art. For instance, the user interface 114 may include, but is not limited to, a computer mouse 126, a track pad, a trackball, a keyboard 128, a touch screen interface 130, a voice input system 132 (e.g., microphone) or an eye tracking system 134.

In one embodiment, a voice input system 132 may be utilized to input data into the companion file of one or more image scan files. For instance, a voice input system 132, such as a microphone, may be utilized by a pathologist to tag one or more regions of interest (ROIs) of an image scan displayed on the display device 110. In another instance, the voice input system 132 may be utilized to insert descriptive notes pertaining to a particular feature or region of interest into the companion file of one or more image scans. The voice inputted tags or notes may later be retrieved by another component of the system 100 (e.g., feature extraction or classifier algorithms) or by a user of the system 100.

In another embodiment, an eye tracking system 134 may be utilized to input data into the companion file of one or more image scan files. For example, the eye tracking system 134 may include an eye movement system configured to track the eye movement of a user. Any known eye tracking method known in the art is suitable for implantation in the present invention. Eye movement tracking is generally described in Q. Ji and X. Yang, "Real-time Eye, Gaze, and Face Pose Tracking for Monitoring Drive Vigilance," *Real-Time Imaging*, Vol. 8, pp. 357-377 (2002), which is incorporated herein by reference. A method and system for eye movement sensing is also generally described in U.S. Pat. No. 5,632,742, issued on May 27, 1997, which is incorporated herein by reference. Further, an eye movement detector is generally described in U.S. Pat. No. 4,973,149, issued on Nov. 27, 1990, which is incorporated herein by reference.

In one embodiment, the eye tracking system 134 of the system 100 may be utilized to track and record the "moves" a user, such as a pathologist, makes when scanning a given image with his/her eye. For instance, the eye tracking system 134 uses the "moves" made by a user's eye to identify one or more ROIs of an image scan. In another instance, the eye tracking system 134 may utilize the "dwell time" by a user in order to identify one or more ROIs. In this manner, a pathologist's "moves" and position of "dwell" may be tracked by tracking eye movements that have been mapped to the spatial coordinates of the image field, allowing the system 100 to determine where on the image field the eye (e.g., the pupil) of the pathologist is resting at a given moment in time. The move and dwell time information may then be stored in an associated companion file, which may later be retrieved by a subsequent user or transmitted to another component of the system, such as the feature extraction algorithms or classifier of the system 100. It is further recognized that the move and dwell time information may be accumulated over multiple sessions by the same or multiple pathologists viewing the specimen. When combined with a previously trained classification algorithm, discussed in more detail further herein, the system 100 may identify features, in subsequently analyzed tissue specimens, similar to those tagged in a current image with the "moves" and "dwell time" of the user's eye.

In one embodiment, the computer system 108 may be configured to perform a series of pre-processing steps to a selected image in order to prepare it for tissue element analysis. For example, a global image analysis process may be performed in order to rebalance the color and dynamic range of the image. In addition, the global analysis may provide distortion correction. In this manner, optical distortion in the image may be calibrated and corrected. Moreover, a histogram equalization method may be applied to each local region of the image, as opposed to the entire image simultaneously. Local application may enhance contrast and aids a user (e.g., pathologist) in identifying and classifying tissue elements (e.g., cells, cell clusters, segments and the like). Further, color images may undergo a rebalancing process without altering hue. It should be recognized that the above operations should not be considered a limitation, but merely illustrations as it is contemplated that a variety of pre-processing operations may be implemented in accordance with the present invention.

Referring again to FIG. 1A, the computer system 108 may be configured to segment one or more of the images at a selected resolution level (e.g., full resolution image or down sampled image) utilizing a segmentation algorithm 114. In particular, a processor of the computer system 108 may execute an image segmentation algorithm stored in the carrier medium 110 of the system 110. In this manner, the segmentation algorithm 114 may act to segment an image scene at a given resolution level into a plurality of scene segment primitives. Further, the parameters of the segmentation algorithm 114 may be trained via user input (e.g., text input, GUI input, voice input, eye movement tracking, and the like). For instance, the system 100 may display selected "image patches" to the user 112 (e.g., pathologist) on a display device 110 (e.g., computer screen). Upon reviewing the image patch on the display device 110, the user 112 may then identify segment primitives within the image patch by inputting data via a user interface 114. The inputted data may then be used by the computer system 108 to adjust the segmentation algorithm parameters and resultantly train the segmentation algorithm 114, which may then be applied to future images.

It is further recognized that a variety of segmentation algorithms 114 are suitable for implantation in the present invention. One such segmentation algorithm is the "mean shift" segmentation algorithm. The mean shift algorithm is generally described in D. Comaniciu and P. Meer, "Mean Shift: A robust approach toward feature space analysis," *IEEE Trans. On Pattern Analysis and Machine Intelligence*, Vol. 24, pp. 603-619 (2002), and is incorporated herein by reference. The segmentation algorithm 104 executed by the system 100 to carry out method 200 is described in more detail further herein.

Figure 2A:
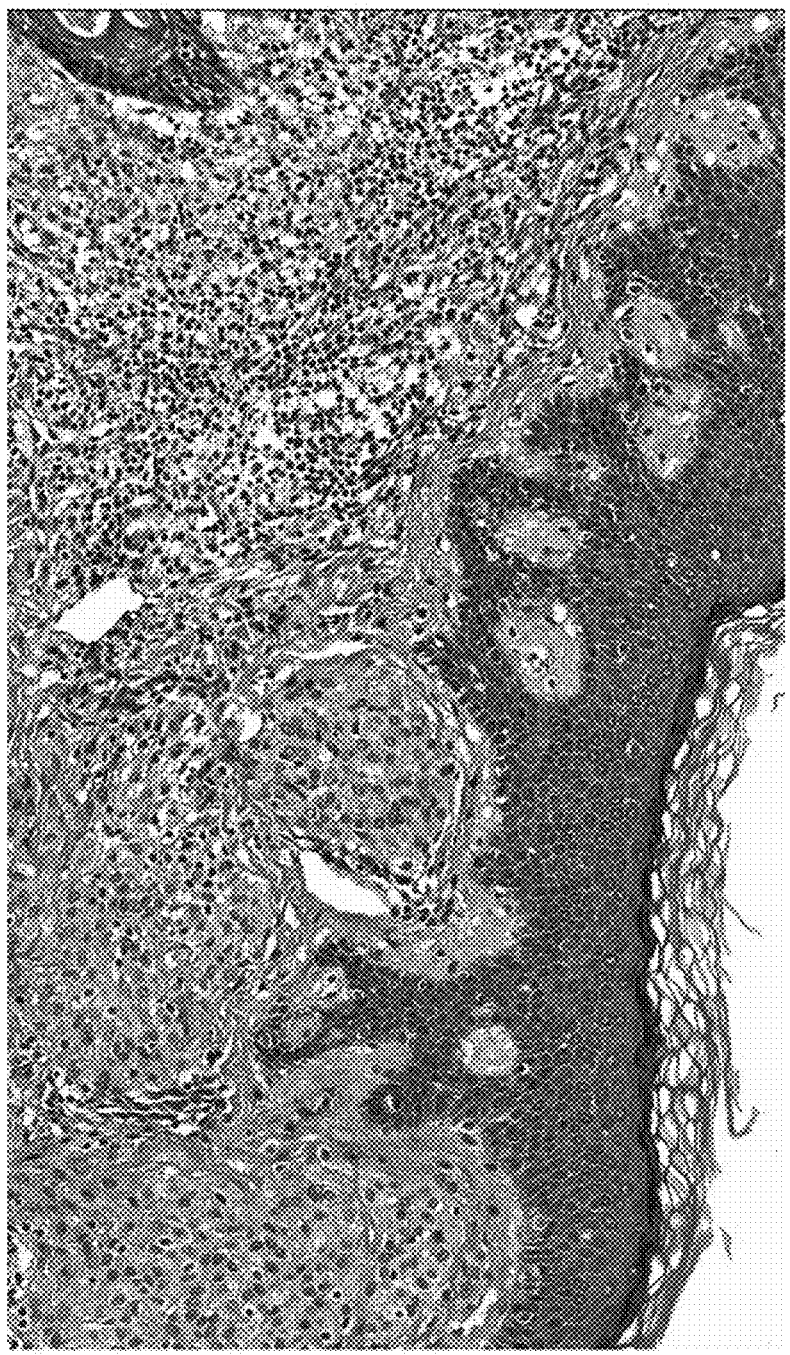
FIG. 2A is a full scale microscope image of a typical tissue specimen for use in the present invention.
Figure 2B:
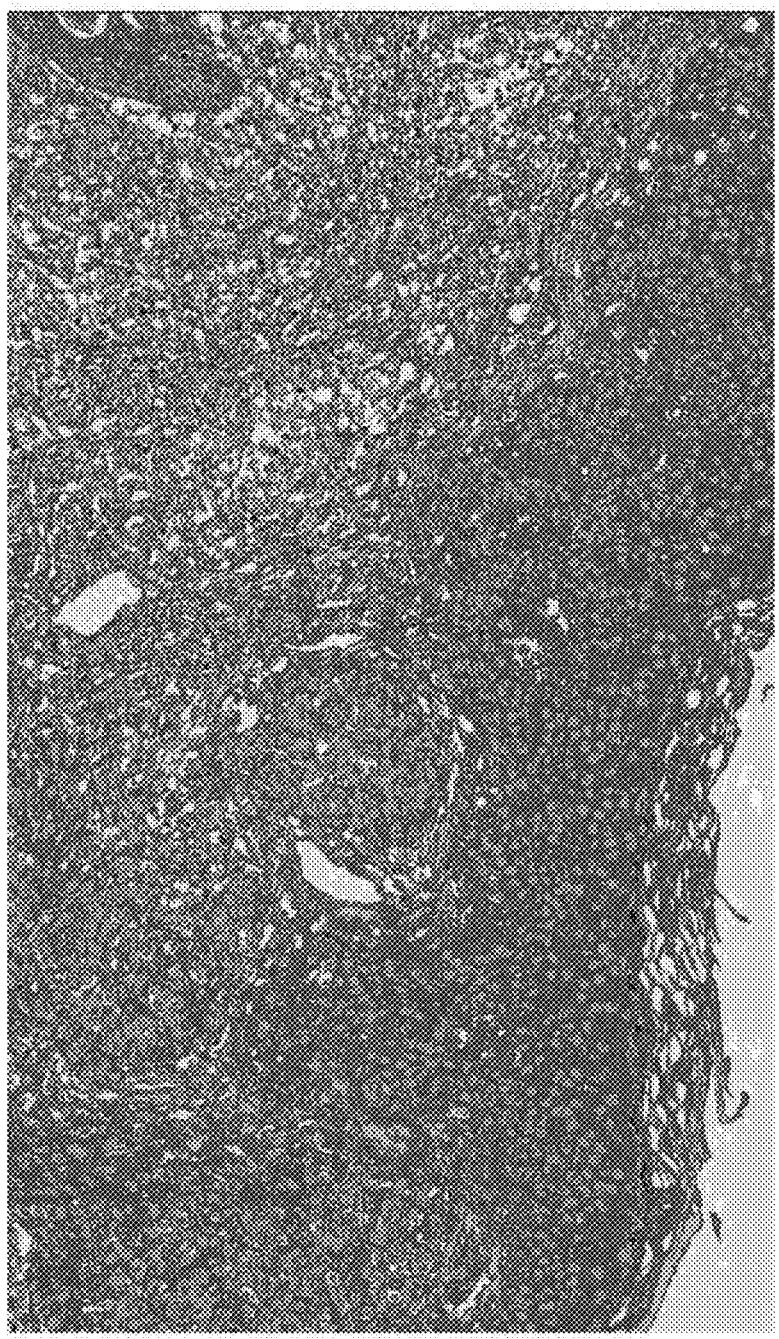
FIG. 2B is a full scale segmented microscope image of a typical tissue, in accordance with one embodiment of the present invention.

Referring now to FIG. 2A and FIG. 2B, a graphical representation of segmentation process carried out by a segmentation algorithm 104 suitable for implementation in the present invention is illustrated. FIG. 2A represents a full resolution "raw" image gathered from a typical tissue specimen utilizing an optical microscopy system (e.g., microscope 104). As observed in FIG. 2A, at full scale, a variety of cells, cell clusters, and interconnective tissue are visible in the tissue specimen. FIG. 2B illustrates a graphical representation of the segmentation of the image carried out via a segmentation algorithm 104. In this respect, each differently colored portion corresponds to a different primitive segment types. Applicant notes that the various segment primitives of FIG. 2B have been color-coded simply for illustrative purposes. These color codes do not reflect, in any way, the color (hue) of those regions of the image. The primitive segments may correspond to different cell types, cell cluster types, and cell separating structure types. In this manner, the tissue elements within the specimen may be identified utilizing the segmentation algorithm 116, which may be trained via pathologist feedback. For instance, pathologist-labeled image segments may be used to automatically train the segmentation algorithm to recognize "good" features to utilize for discriminating between primitive segment types. The learned features may then be utilized by the algorithm to segment image scenes of subsequently analyzed tissue samples. For instance, various cells of the tissue specimen may be identified utilizing pathologist trained images. In another instance, clusters of segments may be identified utilizing one or more clustering algorithms known in the art.

A clustering method as applied to defect clustering is generally described in U.S. Pat. No. 5,991,699 to Ashok Kulkarni et al., issued on Nov. 23, 1999, and entitled "Detecting Groups of Defects in Semiconductor Feature Space," which is incorporated above by reference.

Moreover, it is further recognized that prior to tissue element analysis, image artifacts may first be segmented out of the image utilizing the segmentation algorithm 116 of the system 100. The image artifacts may include, but are not limited to, accumulated dirt or dust, skin fragments, blank areas within the tissue specimen, and sample labels.

Figure 2C:
FIG. 2C is a low scale microscope image of a typical tissue specimen for use in the present invention.
Figure 2D:
FIG. 2D is a low scale segmented microscope image of a typical tissue, in accordance with one embodiment of the present invention.

In another aspect of the present invention, the segmentation algorithm 116 is configured to segment a given image scene at various resolution levels. For example, in addition to segmenting an image at full resolution, as shown above, the segmentation algorithm may segment lower resolution image scenes of the same tissue specimen into a plurality of segment primitives. For instance, as shown in FIGS. 2C and 2D, a segmentation process applied to a "down sampled" image scene of the full resolution image displayed above is shown. FIG. 2C represents an identical image scene as that represented in FIG. 2A, but with a resolution level reduced by a factor of 4, in a process commonly referred to herein as "down sampling" (in this instance by a scale of 4). FIG. 2D represents the segmentation of the image scene in FIG. 2C utilizing the segmentation algorithm 116 of the system 100. The segmentation process of the down sampled imagine scene is performed in a manner similar to that described above for the full resolution image. While the process is similar, the segmentation results are not in fact necessarily identical (and nearly certainly will not be identical). It is recognized herein that the segmentation algorithm 116 executed at a lower resolution level will yield different segment primitives and segment primitive groupings as the pixels used to display the image scene are reduced. It should be recognized that the above description as it pertains to the implemented resolution levels of the image scenes should not be interpreted as a limitation, but merely an illustration, as it is contemplated herein that a vast number (e.g., full resolution, scaled down by 2, scaled down by 4, scaled down by 8, scaled down by 16 and etc.) of resolution levels are suitable for implementation in the present invention.

In another aspect of the present invention, the computer system 108 may be configured to extract one or more features from the segment primitives of one or more image resolution levels utilizing a segment feature extraction algorithm 118. In particular, a processor of the computer system 108 may execute a segment feature extraction algorithm 118 stored in the carrier medium 110 of the system 110. In this manner, the segment feature extraction algorithm 118 acts to extract one or more features from the segment primitives. It should be noted that throughout the present disclosure the segment feature extraction algorithm 118 is often referred to as the "segment feature extractor" 118. Further, the extraction algorithm 118 may be configured to extract color, size, shape, texture, average hue, intensity and saturation features from the primitive segments of an image scene and/or the cells of the primitive segments of an image scene Moreover, statistical attributes related to the above parameters may also be extracted utilizing the extraction algorithm 118. For instance, the distribution of the above parameters derived from a histogram may be extracted.

In another embodiment, the features extracted by the segment feature extractor 118 may be extracted from multiple images of the same tissue specimen utilizing various imaging modes. For example, features may be selected from multiple images of the same tissue specimen in visible broadband mode, fluorescence mode, and transmission mode, among others.

It is further recognized that a variety of segment feature extraction algorithms 116 are suitable for implantation in the present invention. For example, shape feature extraction from an image is generally described in U.S. Pat. No. 4,183,013, issued on Jan. 8, 1980, which is incorporated herein by reference. In addition, feature extraction in the context of biological cells is generally described in Ashok V. Kulkarni, "Effectiveness of Feature Groups for Automated Pairwise Leukocyte Class Discrimination," *The Journal of Histochemistry and Cytochemistry*, Vol. 27, pp. 210-216 (1979), and is incorporated herein by reference.

Further, the parameters of the segment feature extraction algorithm 118 may be trained via user input. For instance, the system 100 may display selected "image patches" to the user 112 (e.g., pathologist). Upon reviewing the image patch on the display device 110 of the system 100, the user may then select examples of primitive segments within the image patch. As is typically the case, a pathologist will select the most relevant aspects of each example to classify the cells and/or cell clusters. The pathologist feedback data may then be used to adjust the segment feature extraction algorithm parameters and resultantly train the extraction algorithm 118, which may then be applied to subsequently analyzed images. In this manner, the extraction algorithm 118 may be trained to automatically select properties or features most relevant to the classification of a given segment primitive. Based on the pathologist's feedback (i.e., algorithm training), the extraction algorithm 118 may automatically select properties or features of the segment primitives of the one or more images relevant to the classification of the primitive segments. Further, the extraction algorithm 118 of the system 100 may be configured to perform this function at various resolution levels (e.g., full resolution, down sized by 2, down sized by 4, down sized by 16, and etc.). At each level, the extractor 118 of the system 100 may select examples of images (e.g. by highlighting the region or by drawing a contour line around it) most relevant to cell, segment and cluster classification and display them to the user on the display device 110, at which point the user may classify the example and that user classification data may be fed back to the extraction and classification algorithm 118.

Figure 2E:
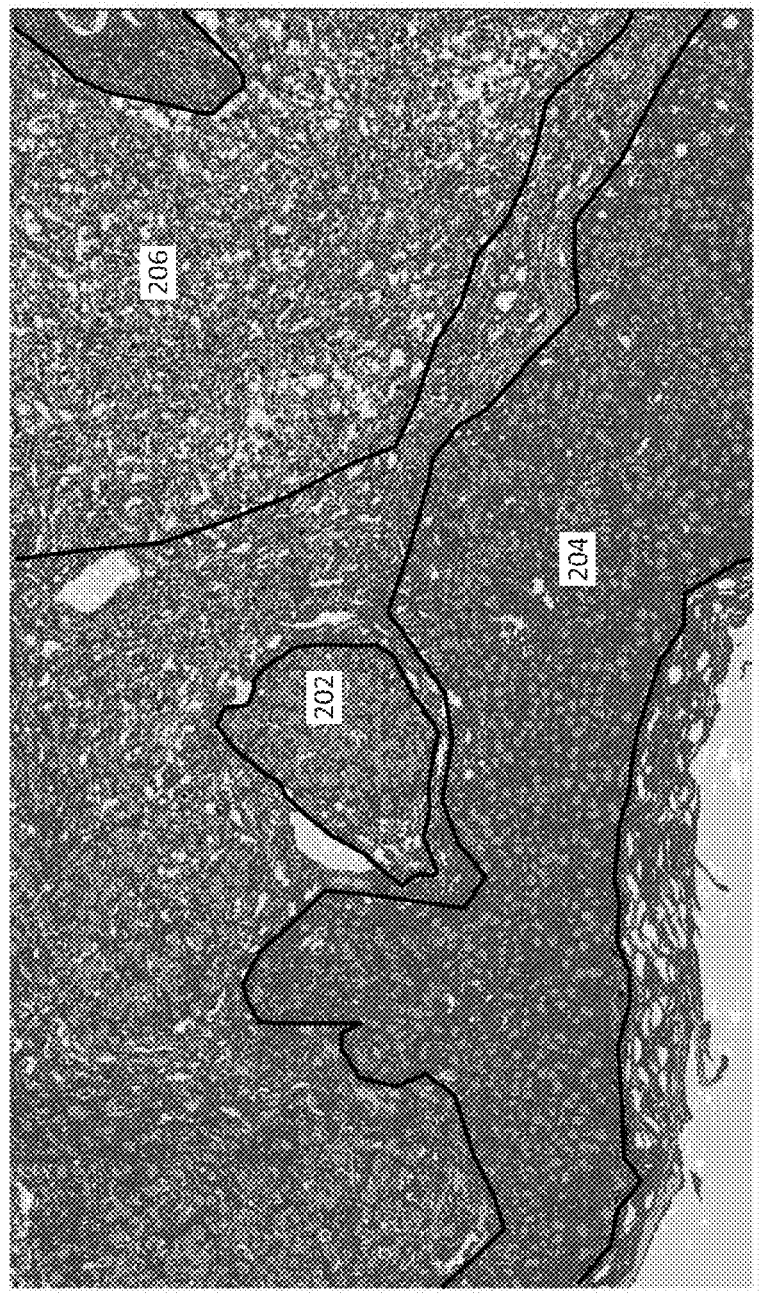
FIG. 2E is a full scale segmented microscope image of a typical tissue illustrating segment clusters, in accordance with one embodiment of the present invention.
Figure 2F:
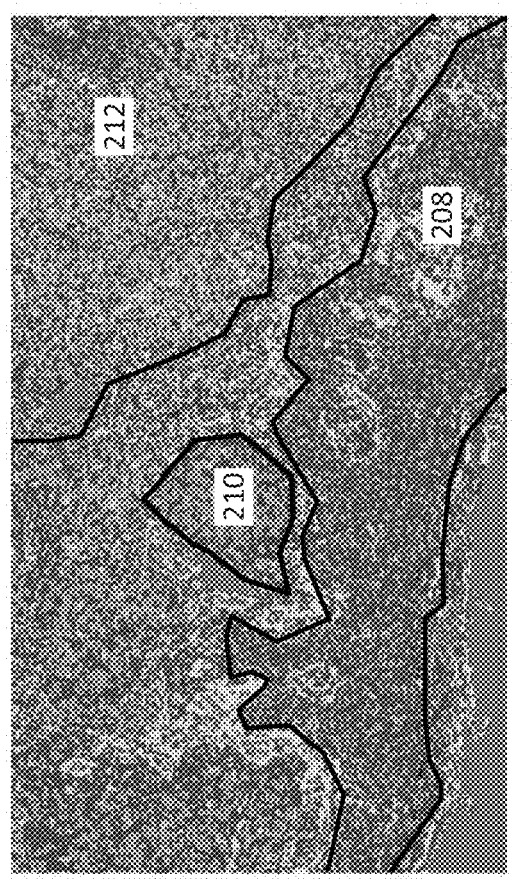
FIG. 2F is a low scale segmented microscope image of a typical tissue illustrating segment clusters, in accordance with one embodiment of the present invention.

In another aspect, the computer system 108 may be configured to construct a segmentation hierarchy utilizing a hierarchy builder algorithm 120. Applicant notes that throughout the present disclosure the hierarchy builder algorithm 120 is commonly referred to as "hierarchy builder" 120. With respect to the operation of the hierarchy builder 120, a processor of the computer system 108 may execute a hierarchy builder algorithm 120 stored in the carrier medium 110 of the system 100. In this manner, the hierarchy builder 120 may act to create a segmentation hierarchy by generating one or more segmentation clusters based on the type and spatial distribution of segment primitives in a group of adjoining or nearly adjoining segment primitives. For example, as shown in FIG. 2E, various segment clusters (e.g., 202, 204, and 206) may be identified in a full resolution image of a particular image segment utilizing a clustering algorithm. It is noted that each cluster 202-204 represents a unique combination and/or spatial arrangement of adjoining segment primitives. Moreover, the hierarchy builder 120 may be configured to perform the segment clustering at various resolution levels. For instance, FIG. 2F illustrates a plurality of segment clusters (e.g., 208, 210, and 212) generated utilizing the hierarchy builder 120 for an image scaled down by a factor of 4 from the original full scale image. Applicant further points out that the segmentation and clustering performed at the low resolution level is carried out independently from the segmentation and clustering which occurs at the highest resolution level.

It is further noted that a variety of clustering algorithms may be adapted for implementation in the present invention. A clustering method as applied to defect clustering is generally described in U.S. Pat. No. 5,991,699, issued on Nov. 23, 1999, which is incorporated above by reference. In addition, segment clustering is generally described in G. B. Coleman and H. C. Andrews, "Image Segmentation by Clustering," *Proceedingss of the IEEE*, Vol. 67, pp. 773-785 (1979), and is incorporated herein by reference. Moreover, a hierarchical clustering method is described generally in D. K. Panjwani and G. Healey, "Markov Random Field Models for Unsupervised Segmentation of Textured Colored Images," *IEEE Transactions on Pattern Analysis and Machine Intelligence*, Vol. 17, pp. 939-954 (1995), and is incorporated herein by reference.

Figure 3:
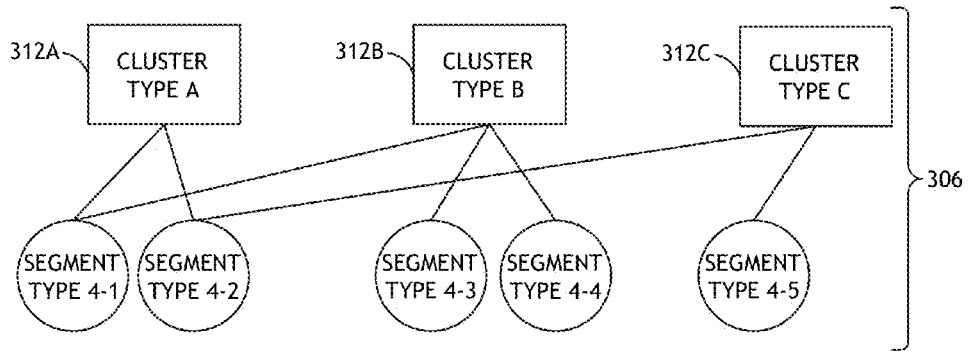
FIG. 3 is a block diagram illustrating a global segment-cluster hierarchy including individual hierarchies at each resolution level, in accordance with one embodiment of the present invention.
Figure 3:
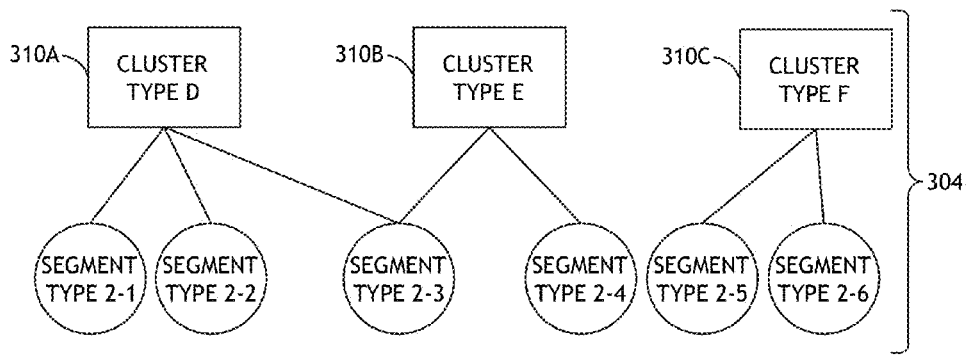
Figure 3:
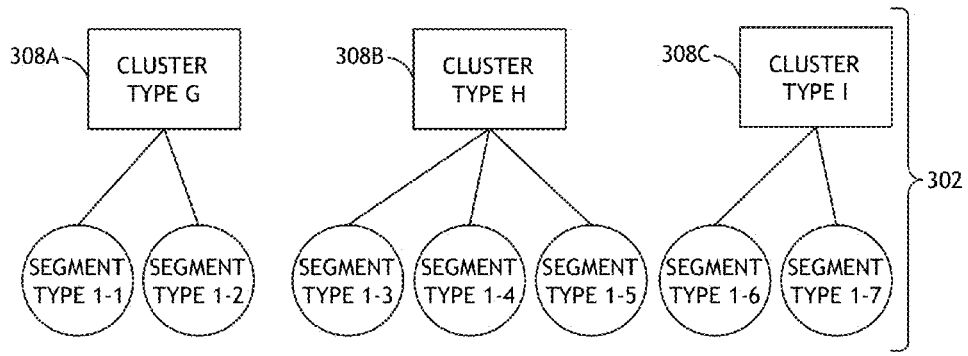

Upon application of one or more clustering algorithms, the hierarchy builder 120 may construct an individual hierarchy for each particular resolution level. For example, as shown in FIG. 3, a global cluster-primitive segment hierarchy 300 may be constructed by building cluster-segmentation hierarchies at various resolution levels of a given tissue specimen. For instance, individual hierarchies 302, 304, and 306 represent individual level hierarchies for a full resolution image, a scaled down by 2 resolution image, and a scaled down by 4 resolution image respectively.

In one aspect of the global hierarchy 300, the applicant again notes that the cluster types and the segment primitives that make up each cluster type are unique at each resolution level of the global hierarchy. This is a result of executing a segmentation algorithm and a segment clustering algorithm at each resolution level of the hierarchy. For example, the clusters identified in a full resolution image of a particular scene may consist of Cluster Type G 308A, Cluster Type H 308B, and Cluster Type I 308C. Each of these cluster types consists of a unique set and/or arrangement of segment primitives. For instance, Cluster Type G 308 may include segment types 1-1 and 1-2, Cluster Type H may include segment types 1-3, 1-4, and 1-5, and Cluster Type I may consist of segment types 1-6 and 1-7. For purposes of comparison, Cluster Type G, H, and I, may, for example, correspond to cluster 202, cluster 204, and cluster 206, respectively, as identified in FIG. 2E. Applicant notes that the above description is merely illustrative and the naming convention of cluster types and segment types above is arbitrary. It is recognized that there exists a vast array of segment type combinations, resulting in a large number of cluster types. The exact number of segments and segment clusters is dictated by, among other things, the particular tissue specimen in question and the parameters utilized by the segmentation and clustering algorithms.

It is further recognized that a particular cluster type is, in part, classified based on the relative weight of its constituent segment types. As such, it is possible for two clusters types to contain the exact same segment types. For instance, due to different proportions of the constituent segment types in a set of segment groupings, the clustering algorithm may identify the groupings as distinct cluster types. In particular, two segment grouping may both consist of segment types 1 and 2. The clustering algorithm (and a human user), however, may classify these two groupings as two different clusters due to the relative proportion of segment type 1 to segment type 2 present in each cluster or the disparate spatial distribution of the segments in each grouping. By way of further example, cluster types and constituent segment types at various other resolution levels may be identified and included in the global hierarchy 300. The various hypothetical cluster types and their constituent segment types at various resolution levels are illustrated graphically in FIG. 3.

In another aspect of the present invention, the computer system 108 may be configured to extract features from the hierarchy 300 utilizing a hierarchy feature extraction algorithm 122. Applicant notes that throughout the present disclosure the hierarchy feature extraction algorithm 122 is commonly referred to as "hierarchy feature extractor" 122. With respect to the operation of the hierarchy feature extractor 122, a processor of the computer system 108 may execute a hierarchy feature extractor 122 stored in the carrier medium 110 of the system 100. In this manner, the hierarchy feature extractor 122 may act to extract features from the individual hierarchies 302, 304, and 306 of the global hierarchy 300. These features may then be utilized to classify the clusters via a trained classifier algorithm 124 or the user, discussed in more detail further herein.

The features extracted from the hierarchies include, but are not limited to, the relative proportion of constituent segment types and/or their spatial arrangement. It is noted herein that the structure of segments within a particular portion of the tissue specimen may identify larger segments. Moreover, features which may be extracted from a given hierarchy (e.g., 302, 304, and 306) include the number of hierarchy nodes, the average degree of nodes, eccentricity, clustering coefficient, or cluster diameter. Additional features which may be extracted include hue, saturation, and intensity level measurements of the pixilated display associate with a given cluster or group of clusters.

In an additional embodiment, the computer system 108 may determine the relationship between clusters of one resolution level (e.g., 302) and the clusters of another resolution level (e.g., 304). For examples, features related to inter-level cluster arrangement include, but are not limited to, types of intersecting clusters, spatial arrangement of the clusters, the number of each cluster type, and the like. For instance, the relationship between the clusters identified at a scaled down by 16 image and the clusters identified at a scaled down by 8 image may be identified and recorded. These features may then be utilized to train a given classifier algorithm 122 of the system or to display features of interest to a user.

It is recognized that a cluster in a scaled down image (e.g., scaled down by 2, scaled down by 4, scaled down by 8, scaled down by 16 and etc.), at a higher resolution level (e.g., full resolution), may be observed to consist of clusters made of segment primitives in this scale of image. Moreover, a cluster at a low resolution level (e.g., scaled by 16) may spatially overlap clusters of a higher resolution level (e.g., scaled by 2) when the low resolution level image is super-posed onto the higher resolution level image.

Further, when a pathologist classifies a given cluster (e.g., 308A) at the highest resolution level 302, that cluster's spatial footprint may be propagated up the scaling tree of the global hierarchy 300 to lower resolution images of the same tissue specimen. At each level of this global hierarchy 300, the system 100 may identify the cluster types that intersect with the one or more clusters of interest (as identified by the user). This information may then be utilized during an image review process to analyze an image first at the lowest resolution level and then to zoom into a particular area of interest to the user.

In another aspect of the present invention, the computer system 108 may be configured to classify one or more features of the segment primitives or segment clusters at each level of the global hierarchy 300 utilizing an autoclassification algorithm 124. In particular, a processor of the computer system 108 may execute an autoclassification algorithm 124 stored in the carrier medium 110 of the system 110. In this manner, the autoclassification algorithm 124 acts to classify one or more of the segments or segment clusters at each level of the global hierarchy 300 utilizing the features extracted from the segments and segment clusters of each level by the extraction algorithms (e.g., 118 and 122). It should be noted that throughout the present disclosure the autoclassification algorithm 124 is often referred to as the "classifier" 124.

In a further embodiment, the classifier 124 of the system 100 may be trained via user input. For instance, the system 100 may display selected "image patches" to the user 112 (e.g., pathologist). Upon reviewing the image patch on the display device 110 of the system 100, the user may then classify select primitive segments within the image patch. This information may then be fed back to the classifier algorithm 124. The pathologist feedback data may then be used to adjust the classifier parameters and resultantly train the classifier 124, which may then be applied to subsequently analyzed images. In this manner, the classifier 124 may be trained to autoclassify tissue elements (e.g., cells, segments, and clusters) by applying the trained classifier algorithm 124 to the features extracted from the segments and segment clusters. As noted, the classifier 124 of the system 100 may be configured to perform this function at various resolution levels (e.g., full resolution, down sized by 2, down sized by 4, down sized by 16, and etc.). Moreover, at each level, the classifier of the system 100 may display selected classified tissue elements to the user on the display device 110, at which point the user may review the classified tissue elements, and provide feedback to the classifier algorithm for further training. In this regard, the trained classifier 124 may be utilized on subsequent tissue specimens to quickly analyze the given image, and showing the user areas of interest without the user having to manually scan the tissue at various magnifications to locate the areas of interest, such as cells or cell aggregates.

In another aspect of the present invention, one or more memory devices may be utilized to log all image processing operations. For example, all operations performed on the image during pre-analysis processing, segmentation, segmentation feature extraction, hierarchy building, hierarchy feature extraction, or classification may be stored in an operation log. In another aspect, segment and hierarchy feature data extracted from each resolution level of an image may be stored on a memory device. Likewise, all imagery data (e.g., TIFF format images) acquired at each resolution level may be stored on the memory.

It should further be recognized that the computer system 108 may include, but is not limited to, a personal computer system, mainframe computer system, workstation, image computer, parallel processor, or any other device known in the art. In general, the term "computer system" may be broadly defined to encompass any device having one or more processors, which execute instructions from a memory medium. It should be recognized that the steps carried out by the system 100 described above may be carried out by a single computer system, or, alternatively, a multiple computer systems. Therefore, the above description should not be interpreted as a limitation on the present invention but merely an illustration. Program instructions 112 implementing methods such as those described herein may be transmitted over or stored on carrier medium 110. The carrier medium may be a transmission medium such as a wire, cable, or wireless transmission link. The carrier medium may also include a storage medium such as a read-only memory, a random access memory, a magnetic or optical disk, or a magnetic tape.

The embodiments of the system 100 illustrated in FIG. 1A may be further configured as described herein. In addition, the system 100 may be configured to perform any other step(s) of any of the method embodiment(s) described herein.

Figure 4:
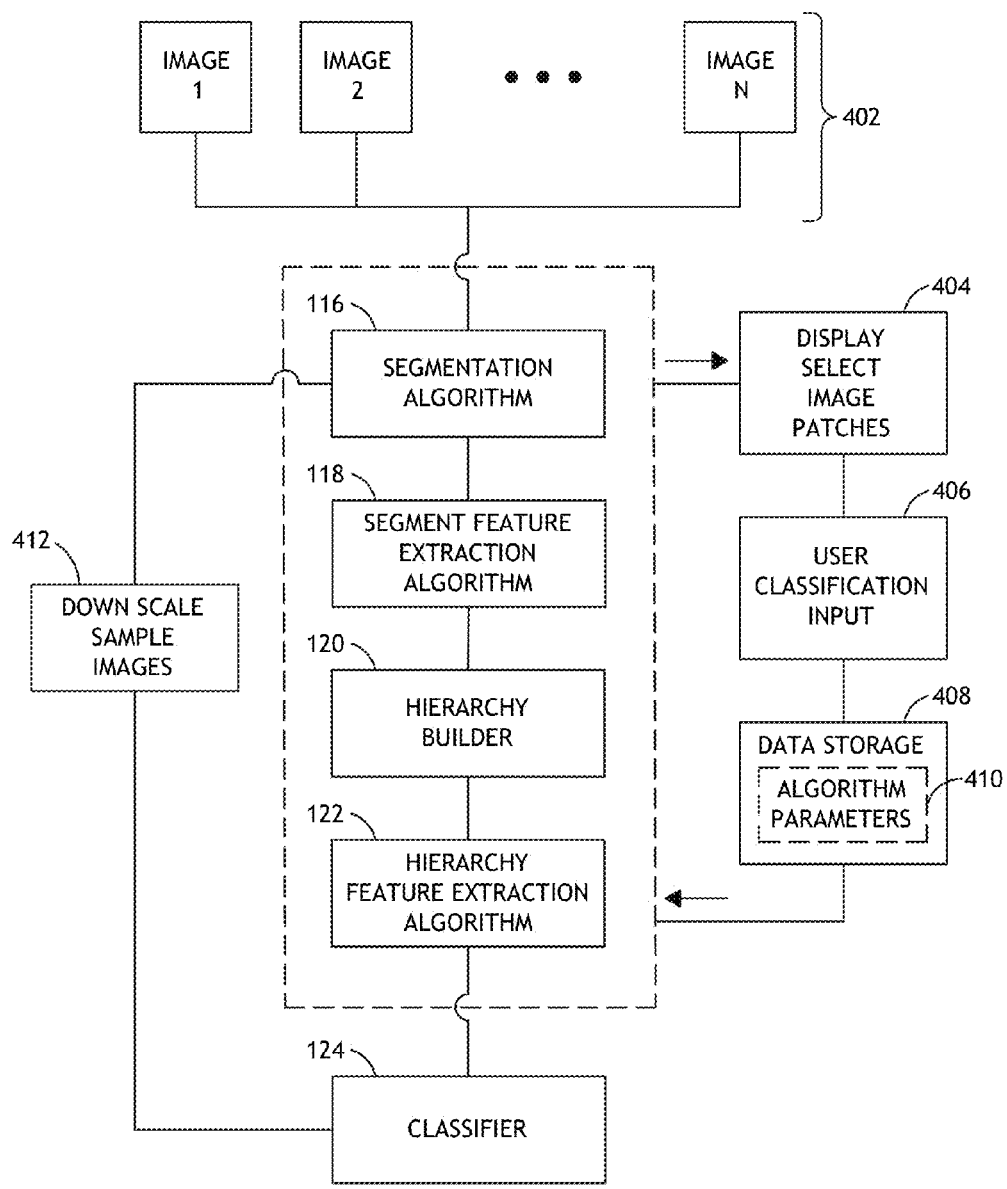
FIG. 4 is a flow diagram depicting an illustrative method for hierarchical segmentation and classification of image data from a tissue specimen, in accordance with one embodiment of the present invention.

FIG. 4 is a flow diagram illustrating steps performed in a process performed utilizing various aspects of the system 100 described previously herein.

In a first step, one or more sets of imagery data (e.g., images 1 through images N) from an image source 102 (e.g., microscope 104 or database 106) may be selected for analysis. An image gallery 402 provides the ability to compare tissue sections from multiple specimens simultaneously. Moreover, various feature values, such as, but not limited to, size, count, density and texture. The image gallery further provides the ability to toggle images of the same tissue section in different imaging modes In a second step, upon receiving a full scale image (e.g., image 1 through image N), the segmentation algorithm 116 of the system 100 may segment the full scale image into a plurality of segment primitives. Following segmentation by the segmentation algorithm 116, the system 100 may display select "image patches" 404 to the user via a display device 110. For example, the system 100 may display segments and clusters dissimilar from those tissue elements previously identified by the user for review and classification. In another example, the system 100 may display segments and clusters similar to those identified by the user for review and classification. As previously discussed above, the user may classify 404 the displayed segments by entering data via the user interface 114 (e.g, voice input, text input, eye tracking input). The user input data (e.g., notes on segment identification, autolog area of interest, log of operations performed on image and the like) may then be stored 408 into a memory (e.g., RAM or ROM). The user provided segmentation identification data may then be fed back to the segmentation algorithm 116, allowing the algorithm to "learn" from the user input by adjusting the parameters of the segmentation algorithm, allowing for improved automatic review on subsequent tissue specimens.

In a third step, following segmentation and segmentation feedback, the segmented image may undergo a segment feature extraction process via the segment feature extractor 118. Following segment feature extraction via the extractor 118, the system 100 may again display select "image patches" 404 to the user via a display device 110. In this manner, the system 100 may display features both similar to and dissimilar from tissue elements previously identified by the user. As previously discussed above, the user may select relevant segment features for segment classification by entering data via the user interface 114 (e.g, voice input, text input, eye tracking input). The user input data may then be stored 408 into a memory. The user provided segment feature extraction data may then be fed back to the extraction algorithm 118, allowing the algorithm to "learn" from the user input by adjusting the extraction algorithm parameters, allowing for improved automatic review on subsequent tissue specimens.

In a fourth step, following segmentation feature extraction and extraction feedback, the hierarchy builder 120 may build a segment hierarchy by clustering the segment primitives provided in the previous step into clusters. Following clustering via the hierarchy builder 120, the system 100 may again display select "image patches" 404 to the user via a display device 110. In this manner, the system 100 may display features both similar to and dissimilar from tissue elements previously identified by the user. As previously discussed above, the user may identify segment clusters in the tissue specimen by entering data via the user interface 114 (e.g, voice input, text input, eye tracking input). The user input data may then be stored 408 into a memory. The user-provided segment-cluster data may then be fed back to the hierarchy builder 120, allowing the algorithm to "learn" from the user input by adjusting the algorithm's parameters, allowing for improved automatic review on subsequent tissue specimens.

In a fifth step, following segment-cluster hierarchy building and segment-cluster feedback, the hierarchy features may be extracted from the hierarchy utilizing the hierarchy feature extractor 122. Following hierarchy feature extraction via the extractor 122, the system 100 may again display select "image patches" 404 to the user via a display device 110. In this manner, the system 100 may display features both similar to and dissimilar from tissue elements previously identified by the user. As previously discussed above, the user may provide segment-cluster classification by entering data via the user interface 114 (e.g, voice input, text input, eye tracking input). The user input data may then be stored 408 into a memory. The user provided classification data may then be fed back to the extraction algorithm 122, allowing the algorithm to "learn" from the user input by adjusting the extraction algorithm parameters, allowing for improved automatic review on subsequent tissue specimens.

In a sixth step, following hierarchy feature extraction 122, a user trained classifier 124 of the system 100 may be utilized to analyze the segment and hierarchy features extracted in the previous steps to classify one or more of the tissue elements of the tissue specimen.

In a seventh step, the image may be "down scaled" 412 to a lower resolution level. For example, a full scale image may be down scaled to an image scene having a resolution level scaled down by 2, 4, 8, 16 or the like. After downscaling, the process steps one through six above, may be repeated. For instance, an image scene down scaled by 4 may undergo the steps one through six described above. In this manner, a global hierarchy 300 may be constructed, which consists of several individual segment-cluster hierarchies for each resolution level. The combination of hierarchical scene segmentation and user-trained classifiers at each resolution level allow the system 100 to rapidly analyze a given image at a high level (i.e., low resolution) in order to identify areas of interest to display to the user during image review at more detail imagery levels (i.e., higher resolution).

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

It is further contemplated that each of the embodiments of the method described above may include any other step(s) of any other method(s) described herein. In addition, each of the embodiments of the method described above may be performed by any of the systems described herein.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed is paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, or voice input, or eye tracking systems, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims. Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto. It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for hierarchical segmentation and classification of image data from a tissue specimen, comprising:
    receiving one or more images of a tissue specimen;
    segmenting the one or more images at a first resolution level and at least a second resolution level utilizing a segmentation algorithm, wherein one or more parameters of the segmentation algorithm are trainable via user classification feedback, wherein the image at the first resolution level is segmented into a first plurality of segment primitives and the image at the at least a second resolution level is segmented into a second plurality of segment primitives;
    extracting one or more features from some of the first plurality of segment primitives and some of the at least a second plurality of segment primitives utilizing a segment feature extraction algorithm, wherein one or more parameters of the segment feature extraction algorithm are trainable via user classification feedback;
    building a first segmentation hierarchy by generating one or more clusters of some of the first plurality of segment primitives utilizing a clustering algorithm, wherein one or more of the clustering algorithm parameters are trainable via user classification feedback;
    building at least a second segmentation hierarchy by generating one or more clusters of some of the at least a second plurality of segment primitives utilizing the clustering algorithm;
    extracting one or more features from the first segmentation hierarchy and the at least a second segmentation hierarchy utilizing a hierarchy feature extraction algorithm, wherein one or more hierarchy feature extraction algorithm parameters are trainable via feedback from user classification feedback;
    determining an inter-level relationship between one or more clusters generated for the first resolution level and one or more clusters generated for the at least a second level by comparing one or more characteristics of the one or more clusters of the first resolution level to one or more characteristics of the one or more clusters of the at least a second resolution level; and
    autoclassifying one or more tissue elements of the tissue specimen via a user-trained classification algorithm utilizing at least one of the extracted features from some of the first plurality of segment primitives, the extracted features from some of the at least a second plurality of segment primitives, the extracted features from the first segmentation hierarchy, the extracted features from the at least a second segmentation hierarchy, the determined inter-level relationship between clusters of the first resolution level and the clusters of the at least a second resolution level, or user classification feedback.

2. The method of claim 1, wherein the receiving one or more images of a tissue specimen comprises:
    receiving at least two images of a tissue specimen, wherein a first image is acquired via a first imaging mode and at a second image is acquired via at least a second imaging mode.

3. The method of claim 1, further comprising:
    pre-analysis refinement processing of the one or more images.

4. The method of claim 1, further comprising:
    displaying one or more regions of interest on a display device.

5. The method of claim 4, wherein the displaying one or more regions of interest on a display device comprises:
    displaying one or more regions of interest on a display device in order to receive user classification feedback.

6. The method of claim 4, wherein the displaying one or more regions of interest on a display device comprises:
    displaying one or more regions of interest on a display device, wherein the one or more regions of interest are identified utilizing the extracted features from some of the first plurality of segment primitives, the extracted features from some of the at least a second plurality of segment primitives, the extracted features from the first segmentation hierarchy, the extracted features from the at least a second segmentation hierarchy, the determined inter-level relationship between clusters of the first resolution level and the clusters of the at least a second resolution level, or user classification feedback.

7. The method of claim 1, further comprising:
displaying one or more regions of interest on a display device, wherein the one or more regions of interest are determined by the autoclassification of the one or more tissue elements.

8. The method of claim 1, wherein the user feedback is provided via a user interface, the user interface comprising at least one of a mouse, a trackpad, a trackball, a keyboard, a touch screen interface, and a voice input system.

9. The method of claim 1, wherein the user feedback is provided via a user interface, the user interface comprising an eye movement tracking system.

10. The method of claim 9, wherein the eye movement tracking system comprises:
an eye movement tracking system configured to monitor at least one of eye movement or eye dwell time.

11. The method of claim 1, wherein the one or more images are received from an image source, the image source comprising a microscope imagery output or an image database.

12. The method of claim 1, wherein the first resolution level is greater than the at least a second resolution level.

13. The method of claim 1, wherein the segmenting the one or more images comprises:
segmenting the one or more images into cells, cell clusters, and interconnective tissue.

14. The method of claim 1, wherein the features extracted from some of the first plurality of segment primitives and some of the at least a second plurality of segment primitives comprise at least one of color, size, shape, texture, average hue, intensity or saturation.

15. The method of claim 1, wherein the one or more clusters of at least one of the first plurality of segment primitives or the at least a second segment primitive is constructed based on the types of segment primitives or the spatial distribution of the segment primitives.

16. The method of claim 1, wherein the features extracted from the first segmentation hierarchy and the at least a second segmentation hierarchy comprise at least one of the relative proportion of constituent segment types, spatial arrangement of constituent segment types, number of hierarchy nodes, average degree of nodes, eccentricity, clustering coefficient, cluster diameter, hue, saturation, or intensity level.

17. The method of claim 1, wherein the one or more characteristics of the one or more clusters of the first resolution level and the one or more characteristics of the one or more clusters of the at least a second resolution level used to determine an inter-level relationship between one or more clusters generated for the first resolution level and one or more clusters generated for the at least a second level comprises at least one of the group including types of intersecting clusters, spatial arrangement of clusters, or number of each cluster type.

18. The method of claim 1, further comprising:
tagging an eye dwell position of a user in an image being viewed by the user utilizing one or more user input devices.

19. The method of claim 18, wherein the tagging an eye dwell position of a user in an image being viewed by the user utilizing one or more user input devices comprise:
tagging an eye dwell position of a user in an image being viewed by the user utilizing one or more user input devices in order to record a class label associated with a location in the image.

20. An apparatus for hierarchical segmentation and classification of image data from a tissue specimen, comprising:
one or more image sources;
one or more user interfaces;
one or more display devices; and
one or more computer systems configured to:
receive one or more images of a tissue specimen;
segment the one or more images at a first resolution level and at least a second resolution level utilizing a segmentation algorithm, wherein one or more parameters of the segmentation algorithm are trainable via user classification feedback, wherein the image at the first resolution level is segmented into a first plurality of segment primitives and the image at the at least a second resolution level is segmented into a second plurality of segment primitives;
extract one or more features from some of the first plurality of segment primitives and some of the at least a second plurality of segment primitives utilizing a segment feature extraction algorithm, wherein one or more parameters of the segment feature extraction algorithm are trainable via user classification feedback;
build a first segmentation hierarchy by generating one or more clusters of some of the first plurality of segment primitives utilizing a clustering algorithm, wherein one or more of the clustering algorithm parameters are trainable via user classification feedback;
build at least a second segmentation hierarchy by generating one or more clusters of some of the at least a second plurality of segment primitives utilizing the clustering algorithm;
extract one or more features from the first segmentation hierarchy and the at least a second segmentation hierarchy utilizing a hierarchy feature extraction algorithm, wherein one or more hierarchy feature extraction algorithm parameters are trainable via feedback from user classification feedback;
determine an inter-level relationship between one or more clusters generated for the first resolution level and one or more clusters generated for the at least a second level by comparing one or more characteristics of the one or more clusters of the first resolution level to one or more characteristics of the one or more clusters of the at least a second resolution level; and
autoclassify one or more tissue elements of the tissue specimen utilizing at least one of the extracted features from some of the first plurality of segment primitives, the extracted features from some of the at least a second plurality of segment primitives, the extracted features from the first segmentation hierarchy, the extracted features from the at least a second segmentation hierarchy, the determined inter-level relationship between clusters of the first resolution level and the clusters of the at least a second resolution level, or user classification feedback.

21. The apparatus of claim 20, wherein the user interface comprises:
a mouse, a keyboard, a touch screen interface, or a voice input system.

22. The apparatus of claim 20, wherein the user interface comprises:
an eye movement tracking system.

23. The apparatus of claim 20, wherein the eye movement tracking system comprises:
an eye movement tracking system configured to monitor at least one of eye movement or eye dwell time.

24. The apparatus of claim 23, wherein the eye movement tracking system configured to monitor at least one of eye movement or eye dwell time comprises:
    an eye movement tracking system configured to execute an algorithm configured to record image locations of at least one of eye movement or dwell time.

25. The apparatus of claim 24, wherein the eye movement tracking system configured to execute an algorithm configured to record image locations of at least one of eye movement or dwell time comprises:
    an eye movement tracking system configured to execute an algorithm configured to record image locations of at least one of eye movement or dwell time, wherein the eye movement tracking system is configured to provide training feedback to a segment classifier or a cluster classifier at one or more resolution levels of an image.

* * * * *